Patented Nov. 16, 1937

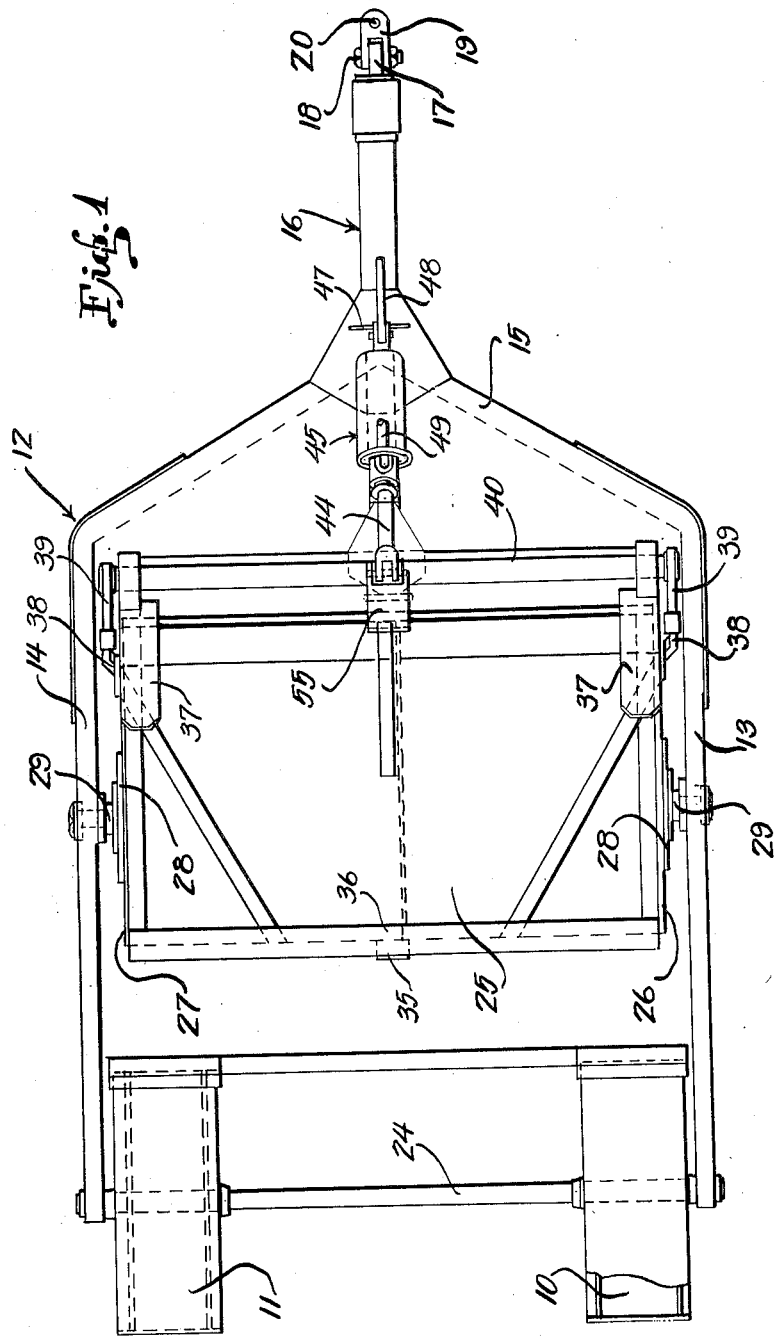

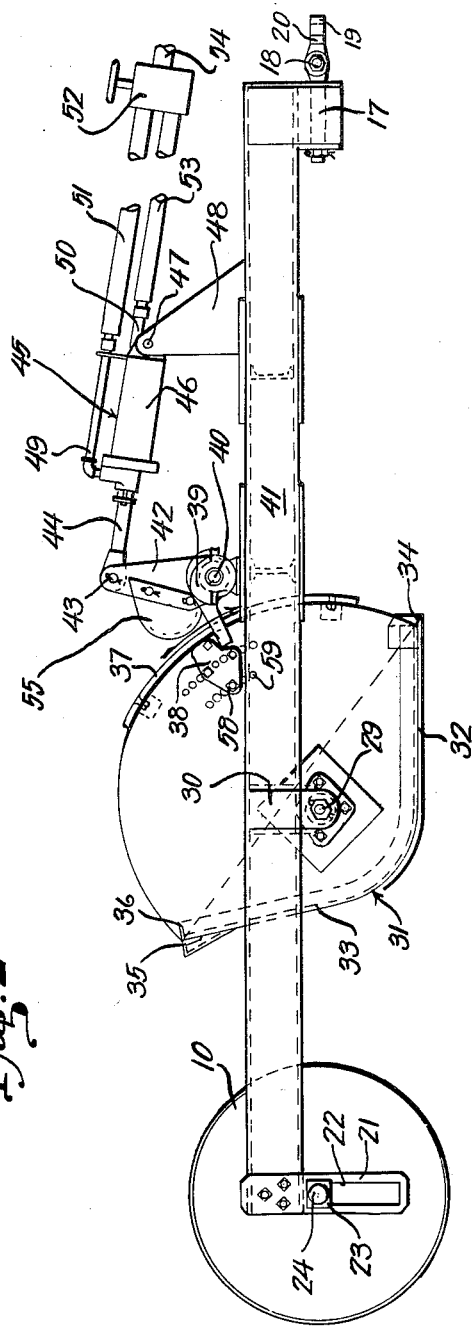

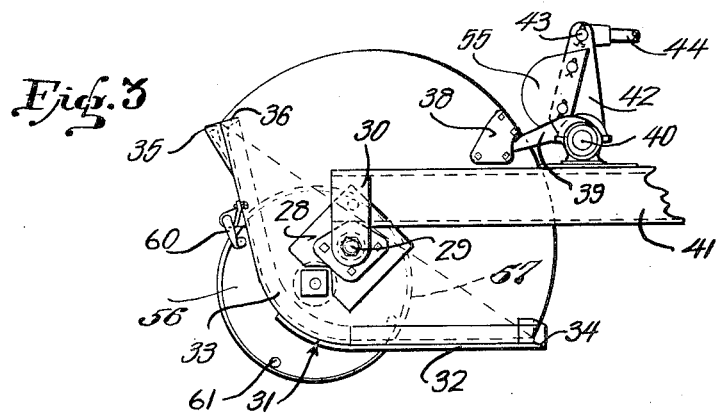
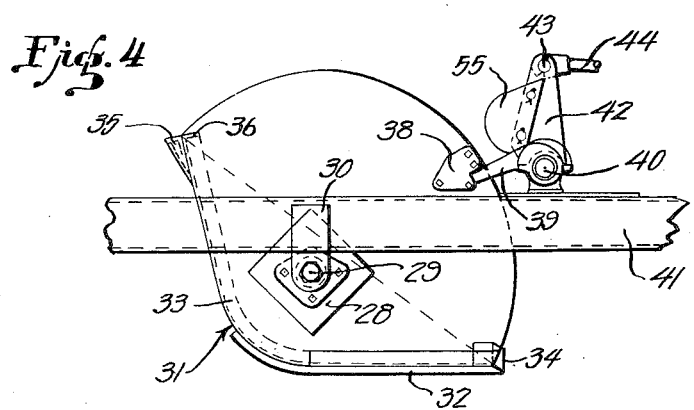
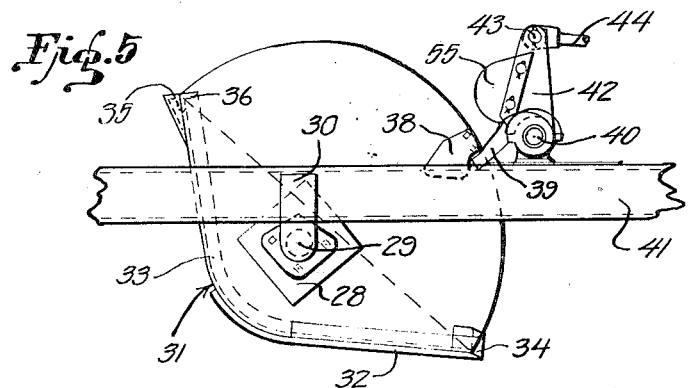

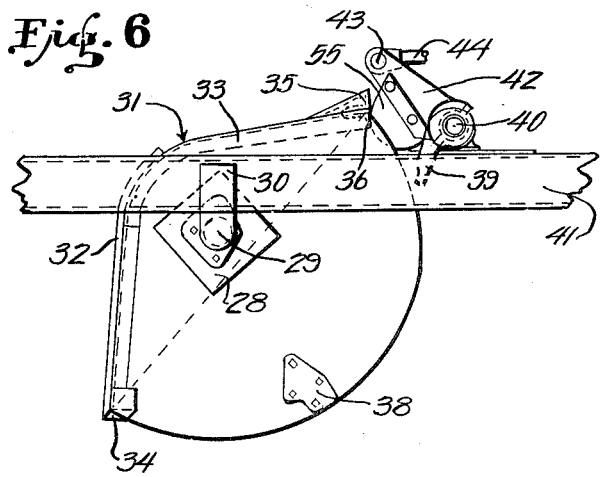
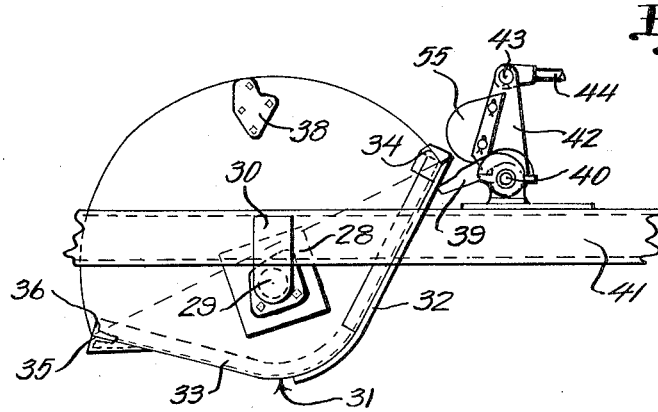
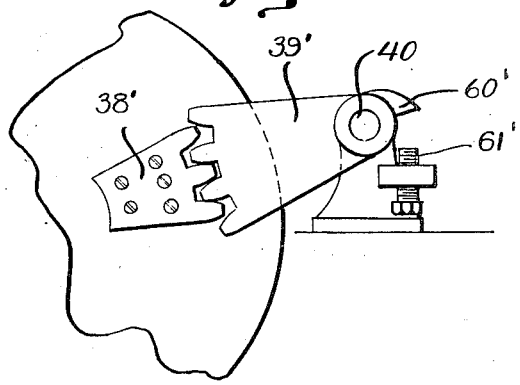

2,099,435

UNITED STATES PATENT OFFICE 2,099,435

COMBINED CARRIER SCRAPER

Ralph M. Davenport, Los Angeles, Calif.

Application April 2, 1935, Serial No. 14,253

3 Claims. (Cl. 37—140)

This invention relates to dirt moving machinery, and particularly pertains to a combined grader and scraper.

In the moving of dirt and the like in making grades, leveling the ground, and in transporting dirt from place to place, it is usual to use a shovel structure by which the dirt may be picked up and by which it may be spread and leveled over the ground. It is the principal object of the present invention to provide a structure designed for the aforementioned purpose which may be drawn from place to place if desired, and in which the bowl or shovel may be readily manipulated to dig the dirt, to elevate it into the bowl, to permit it to be transported from place to place, and to be readily spread as it is discharged from the bowl, all of said operations being remotely controlled from the driver's seat upon a tractor designed to pull the structure, and in which control the bowl of the device may be released and locked in the various desired positions required in operation of the structure. It is a further object of the invention to provide a running gear for the structure which will adapt itself to irregularities in the contour of the terrain without causing the dirt receiving member to spill, and while insuring that a desired scraping and levelling action may be obtained.

The present invention contemplates the provision of a main frame equipped with a running gear, and means whereby the forward end may be supported upon a tractor, said main frame carrying a bowl fitted with a levelling and cutting blade at its forward edge and mounted upon the main frame in a manner to permit it to rotate to various positions as established and limited by a remote control mechanism, and by lock and release means carried on the main frame and engaging the bowl, the structure being further fitted with means whereby relative movement can automatically take place between the main frame and the running gear as required.

The invention is illustrated by way of example in the accompanying drawings in which:

Figure 1 is a view in plan showing the combined grader and scraper with which the present invention is concerned.

Fig. 2 is a view in side elevation showing the scraper.

Fig. 3 is an enlarged fragmentary view showing the scraper bowl equipped with supporting wheels.

Fig. 4 is a diagram showing the scraper bowl in its clearance position.

Fig. 5 is a view showing the bowl in its digging position.

Fig. 6 is a view in diagram showing the bowl in its levelling position.

Fig. 7 is a view in diagram showing the bowl in its carrying position.

Fig. 8 is an enlarged fragmentary view showing another form of bowl stop and control.

Referring more particularly to the drawings, 10 and 11 indicate the road wheels at the rear of a main frame structure 12. The main frame comprises side rails 13 and 14 which are connected to a cross frame member 15. This cross frame member is shown in Fig. 1 as being V-shaped and as carrying a tractor frame hitch 16 at its forward end. This member is tubular and is fitted with a shackle bar 17 at its end to receive a transverse shackle bolt 18, which in turn is connected with a shackle member 19 formed with a vertical opening 20 to receive a king pin by which it is fastened to the tractor. The frame members 13 and 14 are of rigid construction standing substantially horizontally and in spaced relation to each other. Each of the frame members carries an axle plate 21 which is rigidly secured to one of the frame members 13 or 14 and which extends downwardly therefrom. These axle plates are formed with a slotted vertical opening 22 within which a bearing block 23 may reciprocate vertically. The bearing block receives the end of an axle 24 upon which axle both of the road wheels 10 and 11 are mounted. It will be evident that under normal conditions the weight of the main frame 12 will rest upon the bearing blocks but that when the main frame for any reason has vertical movement relative to the wheels the bearing blocks 23 may move along the slotted opening 22 without being lifted off of the ground.

Supported upon the main frame structure 12 is a bowl 25. This bowl has side boards 26 and 27 which carry trunnion plates 28. Projecting from these trunnion plates are trunnions 29 which extend through openings in brackets 30 fixed to and depending from the side rails 13 and 14 of the main frame. Disposed between the side boards 26 and 27 of the bowl is a continuance wall 31 forming a normally horizontal wall section 32 and a normally vertical wall section 33. The forward edge of the wall section 32 is formed with a cutting blade 34 which may be caused to enter the soil to cut and load the same into the bowl and which may also be used as a levelling blade when the bowl is in an inverted position. On the upper edge of the vertical wall section 33 of the bowl angle plates 35 and 36 are disposed. These plates extend transversely of the bowl from the side board 26 to the side board 27 and form a spreading stop as will be hereinafter set forth. Attention is directed to the fact that the side boards have an arcuate edge extending from the cutting blade to the spreading stop. This edge of each side board carries a spreading shoe 37 which extends inwardly for a sufficient width to provide a shoe surface to support the bowl when in its inverted position, as will be hereinafter described. The arcuate length of these shoes is substantially one-half of the length of the arcuate edges of the side boards of the bowl and thus provide sufficient longitudinal bearing surface to prevent the bowl from becoming objectionably embedded in the material over which it may be dragged when the bowl is in its spreading position. Secured to each of the side boards 26 and 27 are bowl control stops 38. These stops extend outwardly and then parallel to the outer faces of the side boards and are formed substantially in a tooth-shaped member which is engaged by a bowl locking dog 39. One of these dogs is mounted on each end of a cam shaft 40 which is journalled in bearings 41 secured to the frame structure of the machine. The shaft 40 is provided at its center with a lever 42 the free end of which is fitted with a pivot pin 43 connected with a piston rod 44 of a hydraulic jack 45. The piston rod carries a piston which reciprocates within a cylinder 46. The cylinder is pivotally mounted at its forward end upon a pin 47 carried by an upright 48 so that the jack may have vertical swinging movement as the lever 42 rocks. A pipe 49 is in communication with one end of the jack 45 and a pipe 50 is in communication with the opposite end of the jack. A hose 51 connects the pipe 49 with a control valve 52 carried upon the tractor and operable by the driver. A hose 53 connects the pipe 50 with the valve 52. By manipulation of the valve 52 fluid under pressure from a suitable power source not shown may be delivered to the valve 52 through a conduit 54 and thereafter directed into either of the hose sections 51 or 53 for the purpose of positively moving the piston rod 44 and swinging the lever arm 42 therewith. The bearings 41 are disposed adjacent the opposite ends of the shaft 40. Attached to the lever arm 42 is a spreading cam 55 which is designed to be interposed in the path of travel of the spreading stops 35 and 36 at the back of the bowl under certain conditions, and in the path of travel of the blade 34 of the bowl when the bowl is reversed.

In the form of the invention shown in Fig. 3 supporting rollers or wheels 56 are mounted in recesses 57 in the wall of the bowl to be thus used under certain conditions.

In operation of the present invention the device is used initially in the form shown in Fig. 1 of the drawings. Here it will be seen that the locking dogs 39 are in engagement with the bowl stops 38. These stops have been set in adjusted positions along the side boards 26 and 27 by means of the bolts 58 which may be adjustably placed in the perforations 59 of the side boards. This adjustment will determine the initial amount of angularity of the lower floor 32 of the bowl and the clearance of the blade 34 with relation to the ground. When it is desired to cause the blade 34 to "dig in" to the soil the valve 52 may be manipulated to cause the locking dog 39 to swing downwardly in the direction of the arrow of Fig. 2 of the drawings, the amount of this downward swinging movement being controlled by the valve 52 so that the amount of penetration of the blade 34 in the soil may be controlled. It will be evident that as the tractor is drawn forwardly the soil will be cut and forced into the bowl. When it is desired to permit the bowl to turn on its trunnions 29 the locking dog 39 may be swung further downwardly so that the bowl will move from the position indicated by diagram in Fig. 5 of the drawings to the position indicated by diagram in Fig. 6 of the drawings. Here it will be seen that the stop members 35 and 36 will encounter the spreading cam 55 and will cause the blade 34 to act as a spreading blade, its position being rearwardly of the axis established by its trunnions 29. When it is desired to carry the bowl in an upwardly presented position it may turn completely over to the position shown in Fig. 7. Attention is directed to the fact that the arc described by the edge of the blade of the bowl is greater than the arc described by the spreading stops of the bowl so that when the lever 42 is swung forwardly to restore the locking dogs 39 to their original obstructing position they will be encountered by the blade portion of the bowl and will support the bowl in the position shown in Fig. 7. A downwardly swinging movement of the locking dogs will release the bowl so that it will again fall toward the position shown in Fig. 4 of the drawings.

Referring more particularly to Fig. 8 of the drawings, it will be seen that the bowl structure may be provided with a stop 38' which is formed with a plurality of teeth adapted to be brought to mesh with teeth formed on a lock member 39', it being understood that in this form of the invention the stop 38' is a substitute for the stop 38 shown in Fig. 2 of the drawings, and that the lock member 39' is a substitute for the lock lever 39 shown in Fig. 2 of the drawings. By this arrangement it is possible to positively move the bowl upwardly and downwardly through an arcuate swing represented by the arcuate length of engagement of the members 38' and 39'. Thus when the locking lever 39' swings downwardly it will positively hold the blade 34 of the bowl in its digging or cutting position, and will not allow it to ride out of the ground but to remain in its adjusted and set position. In this form of the invention it is desirable that the lever 39' be provided with a stop 60' which will engage an abutment 61' carried on the frame of the structure to limit the upward swing of the member 39' so that when it is in its uppermost position its teeth will be properly presented to the teeth of the member 38' and will cause the teeth of the two members to work into mesh as the lock lever 39' is moved downwardly.

By reference to Fig. 3 of the drawings it will be seen that when the bowl 31 is provided with directly supporting road wheels 10 and 11, it may be possible to swing the bowl forwardly and upwardly to a carrying position by backing the vehicle. This is brought about by pawls 60 which are pivotally mounted upon the back wall of the bowl and depend downwardly into the path of travel of a set of pins 61 carried by the road wheels. As the machine moves forwardly, the pins can ride beneath the pawls without disturbing the position of the bowl. When the machine moves rearwardly, one of the pins will encounter the pawls, and since the pawls cannot swing to a position of clearance on this reverse movement, the bowl will be caused to rotate on its supporting axis, and will swing to a load carrying position.

It will thus be seen that the structure here disclosed provides simple and effective means for controlling the bowl and its operation and that it may be remotely controlled to be set in the various operating positions required. It will also be evident that as the structure rides over the ground irregularities will be accommodated permitting the frame structure to rise with relation to the ground wheels 10 and 11 without requiring any complicated mechanism.

While I have shown the preferred form of my invention, as now known to me, it will be understood that various changes might be made in the combination, construction, and arrangement of parts without departing from the spirit of the invention as claimed.

Having thus described my invention, what I claim and desire to secure by Letters Patent is:

1. A device of the character described comprising a rigid main frame having a transverse forward portion adapted to be supported upon a tractor, parallel side rails, ground wheels, a horizontal axle therefor and means connecting said axle to the trailing ends of the side rails, a bowl having a floor and a back wall disposed in angular relation to each other, side walls therefor carrying trunnions, bearings carried by the main frame for rotatably supporting the trunnions and for permitting free rotation of the bowl around the horizontal axis thereof, a cutting blade disposed along the forward end of the floor portion of the bowl, stop members carried by the bowl adjacent the opposite ends thereof, said stop members being adjustably secured to the bowl, a transverse operating shaft rotatably mounted upon the main frame, locking dogs carried by the shaft and adapted to move to and from obstructing and engaging positions with relation to the stop members, fluid operating means for adjustably setting the locking dogs with relation to the bowl in any desired angular position and to release the bowl so that it may rotate on its trunnions, stop means carried on the bowl to limit the rotation thereof while holding the bowl in a spreading position, and a spreading cam on the transverse shaft adapted to be engaged by the stop means on the bowl to optionally maintain the bowl in its spreading position.

2. A device of the character described comprising a main frame having a forward transverse portion and spaced parallel rails, the forward end of said main frame being supported upon a tractor, a pair of road wheels and an axle therefor, a bearing structure upon the trailing ends of the side rails, resting upon the axle, a bowl disposed between the side rails and having oppositely and outwardly projecting trunnions at the ends thereof, said bowl having a floor portion and a back wall disposed in angular relation to each other, and opposite end walls, a cutting blade carried by the forward edge of the floor, the radial length from said cutting blade to the axis of the trunnions being greater than the radial length from the upper edge of the back wall of the bowl to the axis of the trunnions, stop members carried on the opposite ends of the bowl, a transverse shaft mounted on the main frame in advance of the bowl, a pair of locking dogs fixed to the transverse shaft and adapted to be swung as the shaft rotates, said dogs standing in an obstructing position to the bowl during a certain degree of their travel and capable of moving with the stops to adjust the bowl and to swing free of the stops to permit rotation of the bowl, a spreading cam fixed on the transverse shaft at a point intermediate its ends and adapted to be moved to an obstructing position with relation to the upper rear edge of the rear wall of the bowl to limit rotation of the bowl and to cause the blade to form a spreading operation, and a hydraulic jack adapted to be remotely controlled to produce desired rotation of the tranverse shaft to swing it to its various operative positions.

3. A device of the character described comprising a rigid main frame having opposite side rails, the forward end of said main frame being adapted to be supported by a tractor, ground wheels supporting the trailing ends of the side rails, a bowl mounted between said side rails for rotation around a horizontal axis, said bowl having a floor and a back wall, the opposite ends being closed, a cutting blade carried at the forward edge of said floor portion, a stop member carried by the bowl, a transverse shaft mounted on the main frame in advance of the bowl, a pair of locking dogs fixed to the transverse shaft and adapted to be swung as the shaft rotates, said dogs standing in an obstructing position to the bowl during a certain degree of their travel and capable of moving with the stops to adjust the bowl and to swing free of the stops to permit rotation of the bowl, and a spreading cam on the transverse shaft at a point intermediate its ends and adapted to be moved to an obstructing position with relation to the upper rear edge of the rear wall of the bowl to limit rotation of the bowl and to cause the blade to form a spreading operation, and means adapted to be remotely controlled to produce desired rotation of the transverse shaft to swing it to its various operative positions.

RALPH M. DAVENPORT.